Figure 1:
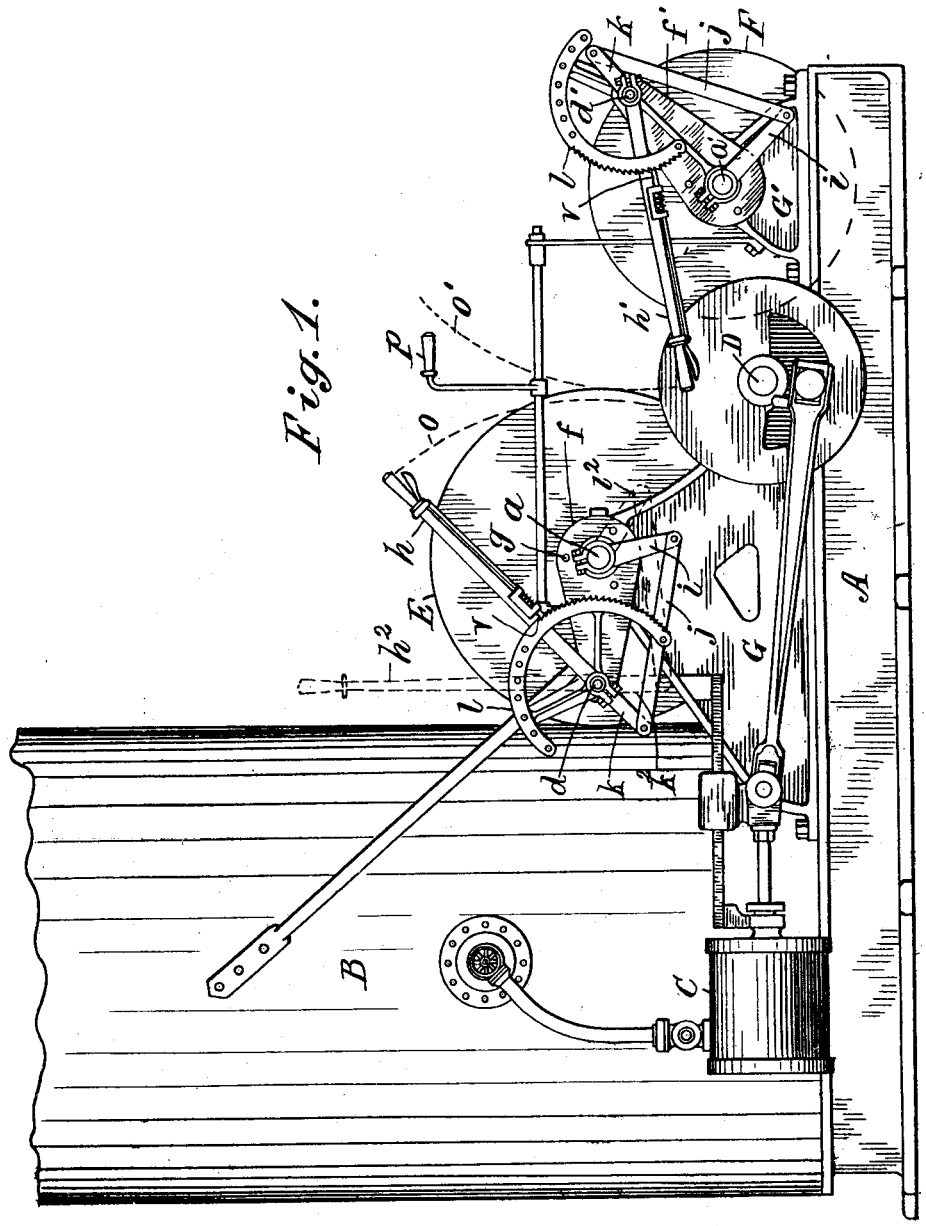

A. LAMBERT.
CLUTCH OPERATING MECHANISM.
APPLICATION FILED SEPT. 11, 1911.

1,077,413.

Patented Nov. 4, 1913.
3 SHEETS—SHEET 2.

Witnesses:
L. Lee.
J. Walter Greenbaum.

Inventor
Asher Lambert, per
Thomas S. Crane, Atty.

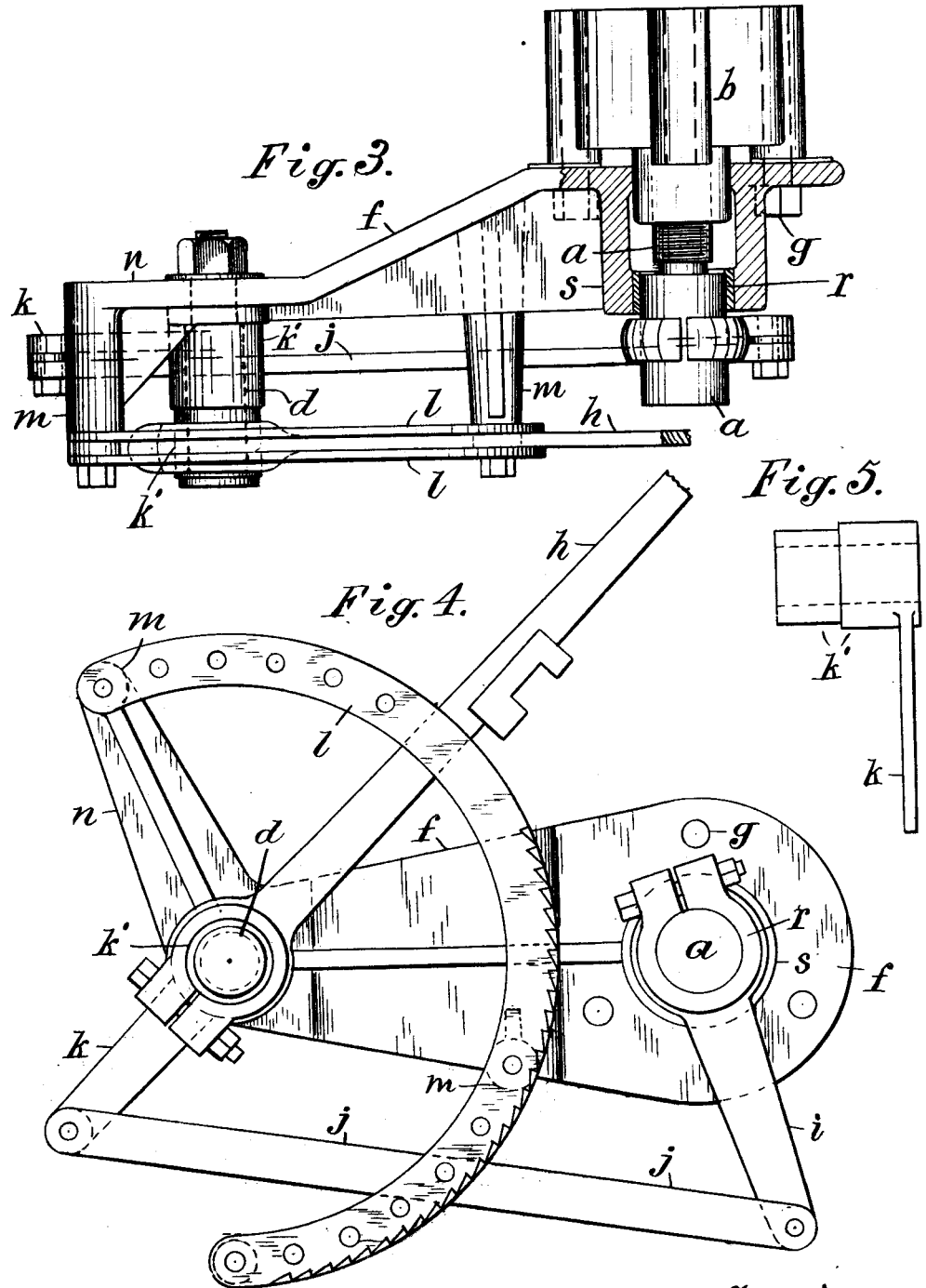

UNITED STATES PATENT OFFICE.

ASHER LAMBERT, OF NEWARK, NEW JERSEY.

CLUTCH-OPERATING MECHANISM.

1,077,413.  Specification of Letters Patent.  Patented Nov. 4, 1913.

Application filed September 11, 1911. Serial No. 648,763.

*To all whom it may concern:*

Be it known that I, ASHER LAMBERT, a citizen of the United States, residing at 1 Johnson avenue, Newark, county of Essex, and State of New Jersey, have invented certain new and useful Improvements in Clutch-Operating Mechanism, fully described and represented in the following specification and accompanying drawings, forming a part of the same.

This invention relates to hoisting machines having one or more shafts upon which a hoisting-drum and clutch are mounted, one of said parts being movable upon the shaft toward the other to engage the drum with the clutch. In such hoisters, it has been common to insert a cross-key through a slot in the shaft in contact with the drum or clutch and to push such parts longitudinally of the shaft by a screw mounted on the axis of the shaft, and supported by the bearing for the journal of such shaft. To facilitate the fitting of the screw to its nut, it has been common to form the nut in a separate casting termed a "claw," which is bolted upon the end of the drum-shaft bearing, and the outer end of the screw being provided with a hand-lever to actuate the clutch.

The object of the present invention is to furnish a special means of pivoting the hand-lever at some distance from the screw so as to bring it into more convenient reach of the operator, and this object is attained by projecting a bracket laterally from the claw and furnishing such bracket at a convenient point with a pivot for the hand-lever, a suitable connection being extended to the screw from the hand-lever in its new position.

The drawing shows the bracket secured to the outer end of the claw by bolts which also secure the claw to the drum-shaft-bearing, and the improvement may thus be applied to machines already in operation. The bracket is constructed to furnish a bearing *r* for the screw outside of its nut, thus greatly diminishing the wear upon the thread of the nut in rotating the screw. The use of such claw brackets to set the hand-lever pivots in a new relation to the clutch-screw, is especially advantageous where two drums are mounted upon the hoister-frame so close together that the levers would overlap upon one another, if extended toward one another to be conveniently moved by the right and left hands of the operator. Where two drums are operated by a driving-shaft intermediate thereto it does bring the hand-levers into such interference, but the projection of brackets outwardly from the two drum-bearings sets the lever-pivots at the desired distance apart to avoid any interference. Where the shaft of one drum is set lower than the other upon the hoister-frame, as is common to permit the passage of the hoisting-rope over the forward drum, the use of such bracket serves also another purpose, in permitting the pivot of the hand-lever for such lower drum-shaft to be set at the higher level, by inclining the bracket upwardly as well as outwardly from the lower drum-bearing. Such inclination may bring the pivots of the hand-levers at nearly the same level. When it is necessary to lock the hand-lever in its adjusted position, a locking segment is mounted upon the bracket concentric with the hand-lever pivot.

The construction will be understood by reference to the annexed drawing, in which—

Figure 2:
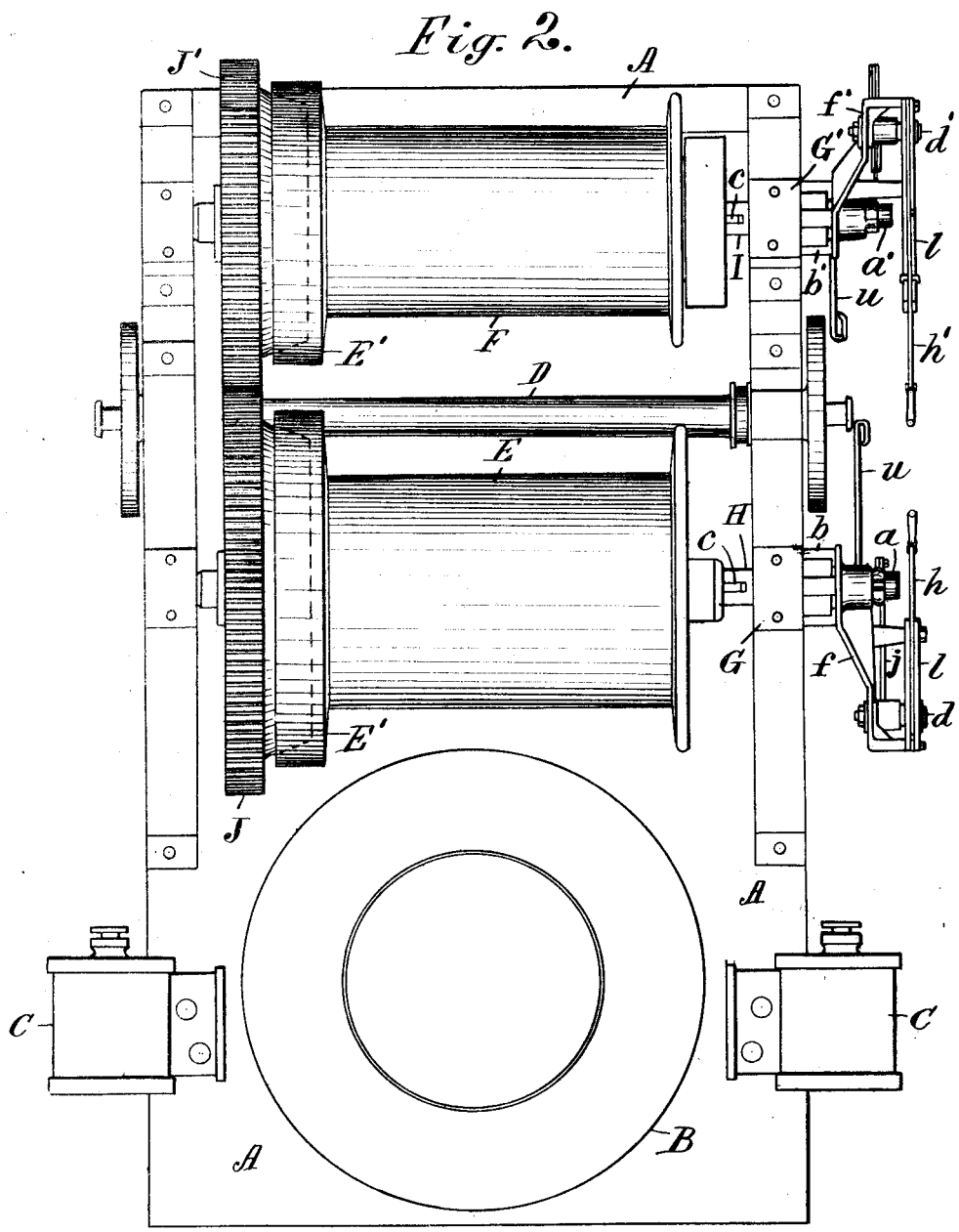

Figure 1 is a side elevation of the hoister provided with the improvements; Fig. 2 is a plan of the same; Fig. 3 is a plan of one of the brackets and its connections, in section where hatched near the center line of the screw; Fig. 4 is a front elevation of the same parts; and Fig. 5 is an edge view of the connection between the hand-lever and its crank-arm.

A hoister is shown with a bed-frame A having a boiler B at one end with engine-cylinders C at opposite sides of the same, and an engine crank-shaft D for operating drums E and F. The drum-bearings G and G' are mounted upon the opposite sides of the frame A, and drum-shafts H and I are mounted respectively therein to carry the drums and the clutch-rings E' which are adapted to engage conical friction-drivers upon the gear-wheels J and J' driven by the engine-shaft.

The engagement of the drums with their respective friction-drivers is effected by the keys *c* and screws *a* and *a'* mounted in claws *b* and *b'* shown secured upon the outer sides of the bearings G, G'. Such claws carry the nut in which the thrust-screw *a* or *a'* is threaded, and are in practice all made of the same dimensions and form for a given type of hoisting engine. Brackets *f* and *f'* are fitted to the outer ends of the claws, being formed of flat ribbed arms provided at their outer ends with the pivots $d$ and $d'$ for the hand-levers $h$ and $h'$, and secured by bolts extended through the foot of each bracket and the adjacent claw into the outer end of the bearing, as shown at $g$ in Fig. 3. Each of the screws is shown with a crank-arm $i$ secured adjustably thereon as is common, and each of the hand-levers is shown with a crank-arm $k$ extended beyond the pivot and coupled to the crank-arm $i$ by a link $j$.

The hand-levers $h$ and $h'$ have each an adjustable split-socket connection with the hub $h'$ of its crank-arm $k$, by which the hand-lever may be set into different relations to such crank-arm so as to bring the hand-lever into convenient position for the operator. This is illustrated in Fig. 1, where the crank-arm $k$ upon the hand-lever $h$ is shown in a line with such hand-lever, while the crank-arm $k$ upon the hand-lever $h'$ is shown at an angle with the hand-lever, so that each may be moved through an arc convenient for the operator. The crank-arm $i$ is similarly adjustable, to vary the screw-pressure.

As the bracket lies upon the outer end of the claw, it affords an opportunity to provide a bearing $r$ for the screw outside of its nut, such bearing being formed in a hub or boss $s$ provided upon the bracket for such purpose.

The head of the screw $a$ is shown enlarged in Fig. 3 so that its crank-arm may have the same bore as the lever $k$, by which the split sockets for adjusting the crank-arms are all made uniform to more readily duplicate the same.

Notched segments $l$ are secured upon each of the brackets concentric with the hand-lever pivot, being bolted to studs $m$ formed respectively upon the body of the bracket and upon a lug $n$ extended from near the pivot, as shown in Figs. 3 and 4.

The hand-levers are as usual provided in practice with spring-latches $v$ to engage the notches of the segments, the only novelty in this part of the construction consisting in the support of the segment upon the bracket concentric with the hand-lever pivot. The mounting of the segments upon the brackets makes the bracket and segment an attachment which may be applied to the claw of a drum-bearing when first constructed, or at any time after it has been in use, to secure the advantages of the present invention.

The link $j$ is shown materially longer than the distance between the centers of the hand-lever pivot and the screw, and the crank-arm $i$ upon the screw is shown somewhat longer than the arm $k$ upon the hand-lever. These proportions cause the screw to move much more rapidly than the hand-lever when loosening the screw, as is indicated by the dotted lines $h^2$, $k^2$ and $i^2$ in Fig. 1. These dotted lines show the arm $k^2$ exerting its full leverage, while the arm $i^2$ is approaching its dead center and therefore making a circular movement more rapid than that of the bracket-arm $k$.

The screw $a'$ requires to be made with a screw-thread reverse to that on screw $a$, as its hand-lever projects in the opposite direction, and turns the screw to the left when pressed downward to tighten the clutch. Such downward movement of the lever $h'$ throws the crank-arm $k$ nearly on its dead center, while the crank-arm $i$ upon the screw has its greatest leverage, thus giving the screw a short movement but greater force, when closing the clutch.

Dotted circles $o$, $o'$, in Fig. 1 show that the paths of the handles upon the levers $h$, $h'$, clear one another, whereas the handles would overlap more than two-thirds of their length if they were placed directly upon the screws $a$, $a'$, and projected toward one another, as it is necessary for the operator to manipulate them both while standing in a fixed position. The location of the hand-levers upon pivots apart from the screws thus not only brings the hand-levers in a more convenient position for the operator, but affords the opportunity of linking the hand-levers to the screws, so as to produce the desirable differential movement.

The throttle-lever $p$ is shown mounted adjacent to the paths of the two levers $h$, $h'$, so as to be readily reached by the operator, but its connection with the steam-throttle is not shown, as it forms no part of the present invention.

In Fig. 2, two brake-levers $u$ are shown between the frame A and the hand-levers $h$, $h'$, such brake-levers being commonly arranged near the lower edge of the bed where they may be reached by the operator and worked by his feet when standing within reach of the hand-levers.

Having thus set forth the nature of the invention what is claimed herein is:

1. In a hoister having a claw with a thrust-screw threaded therein, the combination, with such claw, of a bracket bolted detachably upon the outer end of the claw and projected laterally therefrom, and the said claw having a bearing for the head of the screw outside of the thread in the claw, a pivot upon the bracket and a hand-lever mounted upon such pivot, crank-arms attached to the hand-lever and to the screw outside of the bearing in the bracket, and a link connecting such crank-arms and operating to turn the screw-head in its bearing.

2. In a hoister having a claw, the combination, with a claw having a screw-thread therein, of a bracket bolted upon the outer end of the claw and projected laterally therefrom and having a bearing outside of the thread in the claw, a thrust-screw threaded in the claw and having a head fitted to the bearing in the bracket and projected outwardly therefrom, a pivot upon the bracket, a hub rotatable upon the pivot having the same size as the head of the screw, a hand-lever mounted detachably upon such hub, crank-arms attached to the hand-lever and the screw, and a link connecting such crank-arms, whereby the bracket and parts thereon form a removable attachment to the claw, and the hand-lever may be transferred from the screw-head to the hub on the pivot when such attachment is applied to the claw.

In testimony whereof I have hereunto set my hand in the presence of two subscribing witnesses.

ASHER LAMBERT.

Witnesses:
A. HARRIS,
THOMAS S. CRANE.